(12) United States Patent
Brooks (10) Patent No.: US 7,996,257 B2
(45) Date of Patent: Aug. 9, 2011

(54) COLLECTING, CALCULATING, AND REPORTING QUANTIFIABLE PEER FEEDBACK ON RELATIVE CONTRIBUTIONS OF TEAM MEMBERS

(75) Inventor: Kevin Robert Brooks, Bend, OR (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 11/673,208

(22) Filed: Feb. 9, 2007

(65) Prior Publication Data

US 2008/0195464 A1 Aug. 14, 2008

(51) Int. Cl.
*G06Q 30/00* (2006.01)
(52) U.S. Cl. ............ 705/11; 705/10; 705/14; 705/26; 705/27; 705/37
(58) Field of Classification Search .......... 705/10, 705/11, 14, 26, 27, 37
See application file for complete search history.

(56) References Cited

U.S. PATENT DOCUMENTS

| | | | |
|---|---|---|---|
| 2002/0019765 A1 | 2/2002 | Mann et al. | |
| 2002/0184085 A1* | 12/2002 | Lindia et al. | 705/11 |
| 2003/0115094 A1 | 6/2003 | Ammerman et al. | |
| 2003/0187725 A1* | 10/2003 | Jotkowitz | 705/11 |
| 2003/0216962 A1* | 11/2003 | Heller et al. | 705/14 |
| 2004/0088177 A1 | 5/2004 | Travis et al. | |
| 2004/0128188 A1 | 7/2004 | Leither et al. | |
| 2004/0138944 A1* | 7/2004 | Whitacre et al. | 705/11 |
| 2005/0114199 A1* | 5/2005 | Hanif et al. | 705/10 |
| 2006/0053046 A1* | 3/2006 | Bonnstetter et al. | 705/11 |
| 2006/0064343 A1* | 3/2006 | Burke et al. | 705/10 |
| 2006/0149745 A1* | 7/2006 | Mengerink | 707/10 |
| 2007/0027746 A1* | 2/2007 | Grabowich | 705/10 |

* cited by examiner

*Primary Examiner* — Nga B. Nguyen
(74) *Attorney, Agent, or Firm* — Stephen J. Walder, Jr.; Feb R. Cabrasawan (57) ABSTRACT

Mechanisms for collecting, calculating, and reporting quantifiable peer feedback on relative contributions of team members are provided. Team members may quantifiably evaluate other team members or work group members relative to each other by allocating points from a point pool to each member according to the team member's subjective evaluation. Various types of processing on the quantitative valuations of the team members' relative contributions to a project may be performed to weight the quantitative valuations due to particular criteria, provide relative evaluation calculations between team members' quantitative valuations, report generation, providing action plan suggestions for aiding a team member in increasing his/her relative valuation on future projects, and the like.

18 Claims, 5 Drawing Sheets

TEAM MEMBER PEER FEEDBACK REQUEST FORM

AS A MEMBER OF THE PROJECT Z TEAM, YOU HAVE 1000 "CONTRIBUTION POINTS" TO DISTRIBUTE AMONGST YOUR TEAMMATES BASED ON YOUR PERCEPTION OF THEIR INDIVIDUAL CONTRIBUTION TO THE PROJECT. YOU MUST DISTRIBUTE ALL 1000 POINTS AMONGST YOUR TEAMMATES. DO NOT SKIP ANYONE.

THE POINTS YOU APPORTION TO EACH TEAMMATE ARE BASED ON YOUR PERCEPTION SO RESPOND AS BEST YOU CAN FOR EVERY SINGLE PERSON ON THE PROJECT Z TEAM, EVEN IF YOU DID NOT WORK EXTENSIVELY WITH THE PERSON. PLEASE GIVE YOUR BEST ESTIMATE OF EACH PERSON'S CONTRIBUTION. IT IS IMPORTANT THAT YOU APPORTION EVERYONE ON THE PROJECT Z TEAM POINTS, EVEN IF ZERO (ALTHOUGH THIS WOULD MEAN THAT THE PARTICULAR PERSON CONTRIBUTED NOTHING TO THE COMPLETION OF THE PROJECT), AND USE ALL 1000 POINTS.

AS A GUIDE, WHEN DETERMINING HOW TO DISTRIBUTE POINTS AMONGST YOUR FELLOW TEAMMATES, CONSIDER THE QUESTION "HOW MUCH DID THE PERSON CONTRIBUTE TO GETTING THE PROJECT DONE?" AND CONSIDER SUCH CHARACTERISTICS AS LEADERSHIP, WORK QUALITY, THOROUGHNESS, VOLUME OF WORK, SCOPE OF RESPONSIBILITY, TIME TAKEN TO DELIVER, COMPLEXITY OF THE WORK DELIVERED, WORK ETHIC, BEING AVAILABLE TO OTHERS, HELPING WITHOUT BEING ASKED, AWARENESS OF WHAT WAS GOING ON, BEING "IN-THE-LOOP", COMMUNICATING, ETC. IT MAY BE HELPFUL TO CONSIDER THE VOLUME/QUALITY OF WORK THAT WOULD NOT HAVE BEEN DONE IF THAT PERSON WERE NOT ON THE TEAM.

PLEASE DISTRIBUTE 1000 CONTRIBUTION POINTS AMONGST THE FOLLOWING TEAMMATES:

| | |
|---|---|
| FRED SMITH | 300 |
| JOHN ADAMS | 150 |
| REBECCA MILLER | 550 |
| TOTAL | 1000 |

JOHN DOE'S SCORE WAS EQUAL TO OR HIGHER THAN THE SCORES OF 71% OF HIS TEAMMATES

*FIG. 5B*

JOHN DOE'S SCORE WAS IN THE 47.3 PERCENTILE OF THE RANGE OF SCORES

COLLECTING, CALCULATING, AND REPORTING QUANTIFIABLE PEER FEEDBACK ON RELATIVE CONTRIBUTIONS OF TEAM MEMBERS

BACKGROUND

1. Technical Field

The present application relates generally to an improved data processing system and method. More specifically, the present application is directed to a system and method to collect, calculate, and report quantifiable peer feedback on relative contributions of team members.

2. Description of Related Art

Assessing individual contributions to a group work effort is typically done by collecting anecdotal comments from a sampling of peers to produce text based feedback. This text based feedback leaves the bottom line assessment open to interpretation of the text. Moreover, the text based feedback does not objectively relate the contributions of the individuals who shared the work to one another. Furthermore, the text based feedback does not provide a sense of scale or quantification of an individual's contribution or the differences in contribution between individuals in the group.

Consequently, text based feedback is often disputed as inaccurate based on the interpretation of the words, the subjectivity of the person collecting and summarizing the feedback, and/or because of the absence of access to the feedback of other individuals in the group. Moreover, there is no indicator/measure of the magnitude, whether positive or negative, of the feedback as means of demonstrating the appropriate level of importance of the feedback.

SUMMARY

The illustrative embodiments provide a system and method for collecting, calculating, and reporting quantifiable peer feedback on relative contributions of team members or work group members. The mechanisms of the illustrative embodiments allow team members or work group members to quantifiably evaluate other team members or work group members relative to each other by allocating points from a point pool to each member according to the team member's subjective evaluation. Various types of processing on the quantitative valuations of the team members' relative contributions to a project may be performed to weight the quantitative valuations due to particular criteria, provide relative evaluation calculations between team members' quantitative valuations, report generation, providing action plan suggestions for aiding a team member in increasing his/her relative valuation on future projects, and the like.

In some illustrative embodiments, feedback histories, such as for a plurality of projects over time, for team members may be used to provide reports of relative evaluations of team members. The histories can further be used to weight evaluations, provide action plan suggestions for aiding a team member in increasing his/her relative valuation on future projects, and the like.

In some illustrative embodiments, a project model may be established with project milestones defined at which peer feedback is to be collected. When a project leader, or other person responsible for collecting peer feedback, indicates in the project model that a particular milestone has been achieved, the mechanisms of the illustrative embodiments may automatically send out requests for peer feedback and track the responses to the request for completeness. The mechanisms of the illustrative embodiments may perform various operations on the responses to perform relative evaluations of team members based on the quantitative peer feedback. In performing such operations, different project milestones may be weighted differently. Moreover, different team members' feedback may be weighted differently based on a particular team member's indication of his level of familiarity with the other team members that he/she is evaluating. Moreover, other weighting factors may be included for adjusting the relative evaluation of team members.

In some illustrative embodiments, the peer feedback system of the illustrative embodiments may interface with a personnel system. Information from the personnel system may be utilized to evaluate a person's employment level, general employment area within an organization, and other personnel information that may be used to adjust the peer feedback valuations received from other team members.

In one illustrative embodiment, a method for providing quantifiable peer feedback of team members participating in the completion of a task is provided. The method may comprise defining a team comprising a plurality of team members, sending a request to each team member in the plurality of team members requesting quantifiable peer feedback scores for each of the team member's other team members, and collecting the quantifiable peer feedback scores for each of the team members in the plurality of team members. The method may further comprise calculating statistical representations of each team member's relative contribution to completion of the task based on the collected quantifiable peer feedback scores. The method may also comprise generating one or more reports based on the statistical representations of each team member's relative contribution and outputting the one or more reports.

The request may be sent to each team member based on team member identifiers associated with a team data structure created as part of defining the team. The request may be customized for each team member such that a version of the request sent to a first team member is different from the request sent to a second team member.

Collecting the quantifiable peer feedback may comprise providing a user interface in the request for apportioning a pool of points amongst the plurality of team members. The pool of points may be determined based on a number of team members in the plurality of team members.

The method may further comprise monitoring responses to the request to confirm that all of the team members in the plurality of team members have responded to the request. Moreover, the method may comprise analyzing responses received to confirm that peer feedback provided in the responses is provided correctly.

The one or more reports may be output to the plurality of team members. Generating the one or more reports may comprise customizing a report for each of the team members such that a version of the report output to a first team member is different than a version of the report output to a second team member.

Calculating statistical representations of each team member's relative contribution to completion of the task based on the collected quantifiable peer feedback scores may comprise calculating a total of apportioned points for each team member. Generating one or more reports may comprise generating a relative contribution graph based on totals of apportioned points for each team member.

Moreover, calculating statistical representations of each team member's relative contribution to completion of the task based on the collected quantifiable peer feedback scores may comprise calculating a team percentile for each team member.

Generating one or more reports may comprise generating a team percentile graph based on totals of apportioned points for each team member.

Furthermore, calculating statistical representations of each team member's relative contribution to completion of the task based on the collected quantifiable peer feedback scores may comprise calculating a score percentile for each team member. Generating one or more reports may comprise generating a score percentile graph based on totals of apportioned points for each team member.

The method may further comprise generating, for each team member, one or more weighting factors to be applied to peer feedback parameters in calculations for calculating the statistical representations. Calculating statistical representations of each team member's relative contribution to completion of the task based on the collected quantifiable peer feedback scores may comprise weighting peer feedback provided in responses from team members using the generated one or more weighting factors. The weighting factors may be determined based on information obtained from one of a personnel system or information obtained from a project management system. Moreover, the weighting factors may be determined based on a history or peer feedback for the particular team member. Furthermore, the weighting factors may be determined based on characteristics of one of the team members that are providing the quantifiable peer feedback or characteristics of the team member for which the quantifiable peer feedback is provided. In addition, the weighting factors may be determined based on one of a role in the team assigned to a team member or an employee level of the team member. The weighting factors may also be determined based on a weight value associated with the task.

The method may be implemented in response to a user providing an input to a project management system indicating that the task has been completed. The project management system may send a request to the data processing system to perform the method in response to the input.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is one example of a request that may be sent out to client devices to request that users of the client devices return peer feedback for their fellow team members in accordance with one illustrative embodiment;

DETAILED DESCRIPTION OF THE ILLUSTRATIVE EMBODIMENTS

The illustrative embodiments provide a mechanism by which peer feedback may be collected and processed in order to give a quantitative assessment of a team member's contribution to a team or work group project. As such, the illustrative embodiments are especially well suited for implementation in a distributed data processing system in which peers may provide their peer feedback via their client machines to one or more server computing devices that perform the processing of the peer feedback. In order to provide a context in which to understand the operation of the illustrative embodiments, FIGS. 1-2 hereafter are provided as examples of a distributed data processing system and a computing device which may be used with the distributed data processing system. As one exemplary implementation, the various aspects of the illustrative embodiments described hereafter may be implemented in this distributed data processing system and computing device.

Figure 1:
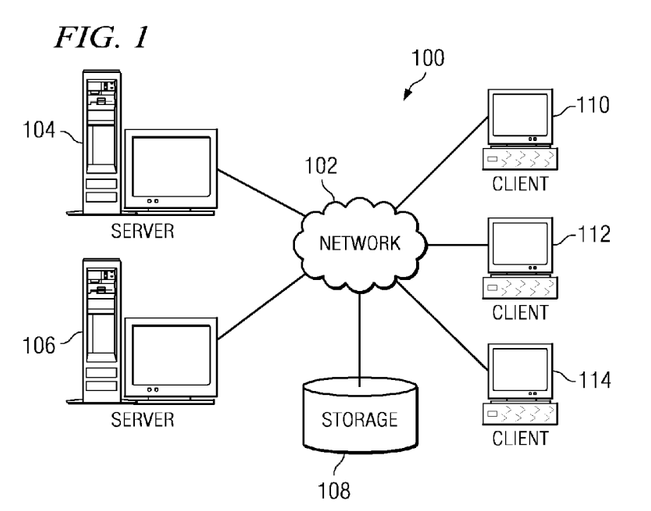
FIG. 1 depicts a pictorial representation of an exemplary distributed data processing system in which aspects of the illustrative embodiments may be implemented.
Figure 2:
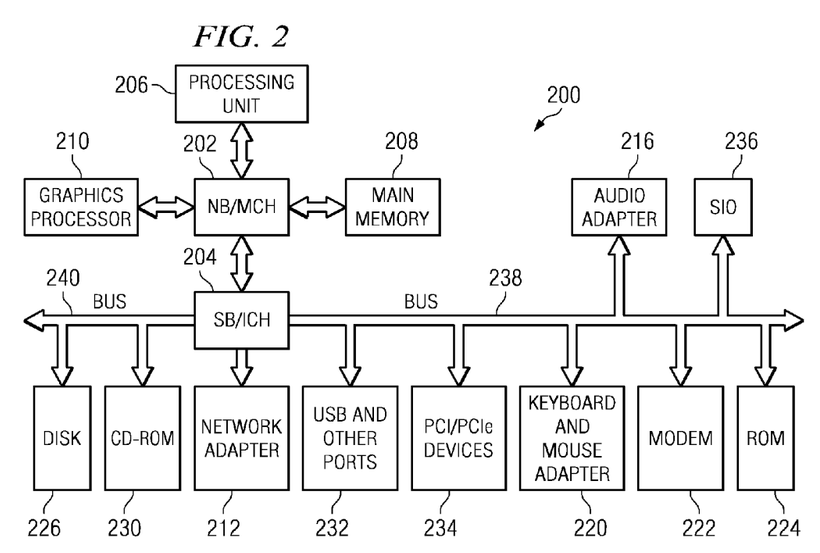
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pseries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, the server 104 or server 106 may provide a peer feedback system that may perform the various operations of the illustrative embodiments described hereafter to collect, calculate, and report quantifiable peer feedback on relative contributions of team members or team mates. The server 104 or 106 may send out requests for peer feedback from team members or other personnel via the at least one network 102 to the client devices 110-114.

The server 104 or 106 may then monitor the responses from the client devices 110-114 to ensure that peer feedback is obtained from all of the personnel that requests were sent to. The server 104 or 106 may then process the responses to thereby collect and calculate quantifiable representations of the various team members' relative contributions to the completion of a project. Based on the quantifiable representations, various reports may be generated and provided to supervisory personnel, team members, or the like.

In addition, the server 104 or 106 may communicate with other systems, including a personnel data base (which may be provided as network attached storage system 108, for example), project management systems (which may be provided in the other of server 104 or 106, for example), and the like. Information may be obtained from these various systems to aid in calculating the quantifiable representations of the relative contributions of the team members.

Figure 3:
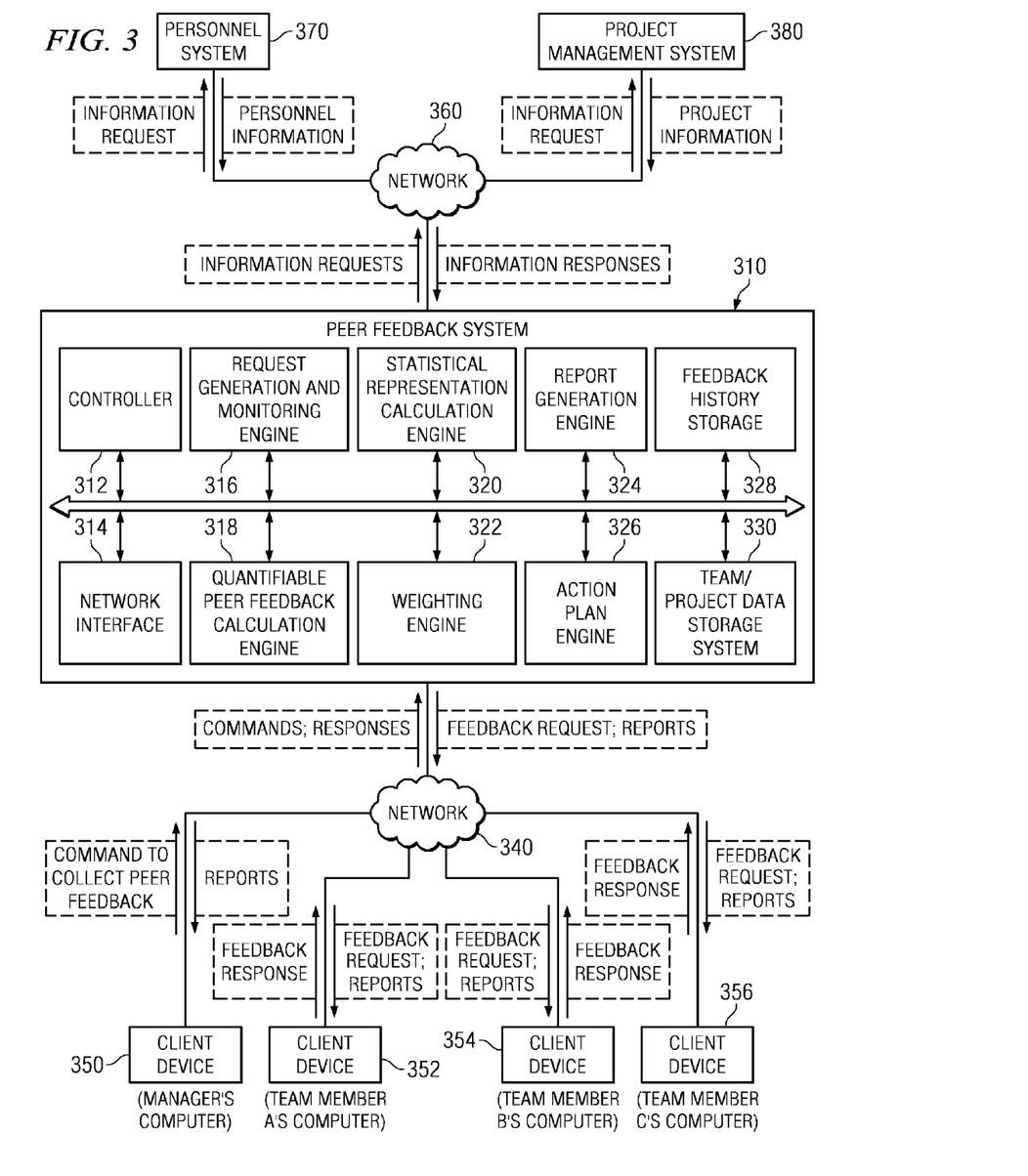
FIG. 3 is an exemplary block diagram illustrating the primary operational components of a peer feedback system in accordance with one illustrative embodiment.

FIG. 3 is an exemplary block diagram illustrating the primary operational components of a peer feedback system in accordance with one illustrative embodiment. As shown in FIG. 3, the peer feedback system 310 includes a controller 312, a network interface 314, a request generation and monitoring engine 316, a quantifiable peer feedback calculation engine 318, a statistical representation calculation engine 320, a weighting engine 322, a report generation engine 324, an action plan engine 326, a feedback history storage 328, and a team/project data storage system 330. The elements 312-330 may be implemented in software, hardware, or any combination of software and hardware. In one illustrative embodiment, the elements 312-330 are implemented as software instructions executed by one or more processors.

The controller 312 controls the overall operation of the peer feedback system 310 and orchestrates the operation of the other elements 314-330. The elements 314-330 perform various functions for obtaining and processing quantifiable peer feedback. The operation of these elements 314-330 will be described in greater detail hereafter.

The peer feedback system 310 is coupled to one or more data networks 340 and 360. The peer feedback system 310 may send requests and receive responses from client devices 350-356 via the data network 340. The client devices 350-356 may comprise a plurality of team member computers, e.g., computing devices used by team members A-C, and one or more manager or supervisor computers. The manager or supervisor may use his/her computer 350 to provide input to the peer feedback system 310 regarding team members, roles of team members on the team, project details, and the like, and may send commands to the peer feedback system 310 to instruct the peer feedback system 310 to collect and process peer feedback from the other client devices 352-356.

The peer feedback system 310 may further communicate with a personnel system 370 and project management system 380 via network 360, which may be a local area network, for example. Alternatively, rather than accessing the personnel system 370 and the project management system 380 by a separate network 360, the peer feedback system 310 may access these systems via the same data network 340 used to communicate with client devices 350-356. It should further be appreciated that while the feedback history storage 328 and the team/project data storage system 330 are illustrated as being part of the peer feedback system 310, these storage systems, or portions of these storage systems, may be provided as part of the personnel system 370 and/or project management system 380.

Prior to, during, or after the completion of a project or a portion of a project, such as a sub-project, a manager or supervisor, via his/her client device 350 may interface with the peer feedback system 310 to define the team for which peer feedback is sought. In identifying the team, the manager or supervisor may designate a team identifier, a project or sub-project identifier of a project being worked on by the team, and the individual persons, i.e. team members or team mates, which make up the team. These persons should share a discrete assignment such that they depend upon one other to achieve its successful delivery. Teams should have a shared goal and should work closely enough throughout the project to allow them to have an opinion on each others contribution.

The individual team members may be identified by a team member identifier, such as the name of the person, an email address, personnel identifier within the organization, network identifier, or any other uniquely attributable identifier. Moreover, if the embodiment includes a functionality for the peer feedback system 310 to access personnel information for an organization from, for example, the personnel system 370, via the network interface 314 and data network 360, then the manager or supervisor may select personnel from a listing of personnel provided by the personnel system 370. In response to such a selection, the peer feedback system 310 may retrieve personnel information from the personnel system 370 for later use in processing peer feedback, as discussed hereafter.

In addition to defining a team and identifying the team members of the team, the manager or supervisor may assign roles to each of the individual team members to further define their intended participation in the performance of the project. For example, various predefined roles may be selected from for each of the team members, e.g., team leader, software encoder, tester, etc. These various roles may be correlated to weighting factors for weighting peer feedback as will be described hereafter. The defining of the team and the team members and their roles may result in a team data structure being established in the team/project data storage system 330. This data structure may later be used to request and process peer feedback from team members as well as correlate peer feedback data with data obtained from the feedback history storage 328, the personnel system 370, and the project management system 380.

At a point in time, preferably following completion of the project or a portion of a project upon which the team is working, the manager or supervisor may send a command to the peer feedback system 310, via his/her client device 350 and data network 340, to request that the peer feedback system 310 collect and process quantifiable peer feedback from the team members. The command/request from the manager or supervisor may designate the team and/or project for which quantifiable peer feedback is desired. The designation of the team and/or project in the command/request may be correlated to similar identifiers in the team/project data storage system 330 to thereby retrieve the team data structure for which quantifiable peer feedback is sought.

In response to receiving such a command/request from the manager or supervisor, the controller 312 of the peer feedback system 310 may instruct the request generation and monitoring engine 316 to send out requests for quantifiable peer feedback to the client devices 352-356. Requests may be sent using network addresses, email addresses, or other contact information corresponding to the team members identified in the team data structure. This contact information may be stored in the team data structure or may be retrieved from the personnel system 370 by correlating identifiers in the team data structure with similar identifiers in the personnel system 370.

FIG. 4 is one example of a request that may be sent out to client devices 352-356 to request that users of the client devices 352-356, i.e. the team members, return peer feedback for their fellow team members. As shown in FIG. 4, the request may include instructions for guiding the recipient of the request in evaluating other team members and providing quantitative peer feedback for each of their fellow team members. The request may be provided as an electronic mail message having hyperlinks to editable forms to which the user may provide input. Moreover, the request may be the electronic form itself, an applet, or any other mechanism that may be distributed to various recipients and through which user input may be received and returned to a sender of the request.

It should be noted that the request is customized for each intended recipient such that the same request may not be sent to each of the team members. For example, the request may be customized by including fields or links for inputting quantitative peer feedback only for the other team members other than the recipient of the request. Thus, the request received by team member A will have fields or links for inputting quantitative peer feedback for team members B and C and the request received by team member B will have fields or links for inputting quantitative peer feedback for team members A and C. Other types of customization may also be used in addition to, or in replacement of, the above customization. For example, requests may also be customized to include a specific project name for which feedback is being sought, or the like.

In one illustrative embodiment, the request for quantifiable peer feedback may request that the recipient apportion a pool of points to each of the other team members identified in the request. Thus, for example, a pool of 1000 points may be made available and the recipient must apportion the 1000 points amongst the other team members. The size of the pool of points may be adjusted by the peer feedback system 310 based on a size of the team such that a fine enough relative evaluation of team members is received. That is, a pool size of 100 for a 10 person team may not provide as much insight into the relative performance of team members as a pool size of 1000. However, one does not want the pool size to be too large or else the recipient providing the quantitative feedback may be frustrated in trying to distribute so many points amongst the team members.

The user interface through which the recipient actually apportions the pool of points may take many different forms. For example, a simple input field may be provided in which a numerical value may be input. Alternatively, a slide bar user interface may be provided such that the recipient may slide the bar to various settings between 0 and the total size of the pool. Other interfaces may be used without departing from the spirit and scope of the present invention.

It should be noted that while the exemplary embodiment shown in FIG. 4 allows a recipient to evaluate each of the other team members in a general manner by providing a point score for each team member, more fine grain evaluation of the performance of each team member may be made using the mechanisms of the illustrative embodiments. For example, a plurality of categories of team member characteristics with regard to completion of the project may be provided and may each be quantitatively evaluated in a similar manner as described above with regard to the general evaluation of team members.

Once the recipient of a request has provided the required input of quantitative peer feedback for his/her fellow team members, the recipient may select a user interface element, e.g., a virtual button or the like, to send the quantitative peer feedback back to the peer feedback system 310. Alternatively, where the request serves only as an invitation with links to web pages or other user interface mechanisms for inputting the quantitative peer feedback, selecting the user interface may simply return an acknowledgement message to the peer feedback system 310 indicating that the recipient has completed evaluating his/her team members.

The request generation and monitoring engine 316 may monitor the responses received and may periodically send out reminders to recipients of requests to remind them to return the quantifiable peer feedback if they have not already done so. If not all of the responses are received within a predetermined period of time, the request generation and monitoring engine 316 may send a message to the manager or supervisor's client device 350 informing the manager or supervisor that the quantifiable peer feedback operation could not be completed due to a failure to obtain all peer feedback. The manager or supervisor may then take corrective action to ensure that all team members return the requested peer feedback and may then issue a new request to the peer feedback system 310 for the quantitative feedback operation.

Moreover, the request generation and monitoring engine 316 may check the responses received from the client devices 352-356 to make sure that the recipient input their point apportionments correctly. That is, the request generation and monitoring engine 316 may check to make sure that the points allocated to each team member in each response total a size of the original point pool. In some illustrative embodiments, the fields for entry of the points may be linked such that the total must always be equal to the size of the original point pool. For example, if slider bars are used to apportion the points, when the user slides one bar higher up toward the total size of the point pool, the other slider bars for the other team members may have their slider bar limits adjusted automatically.

Assuming that all of the team members return the requested quantifiable peer feedback and have done so properly, the controller 312 of the peer feedback system 310 may then provide the quantifiable peer feedback data from the responses to the quantifiable peer feedback calculation engine 318. The quantifiable peer feedback calculation engine 318 may total the apportioned points for each team member based on the received responses. For example, the total points for each team member may be calculated as follows:

$$P1\ Total = (P2\ given + P3\ given + \ldots + Pn\ given)$$

$$P2\ Total = (P1\ given + P3\ given + \ldots + Pn\ given)\ \text{etc. to}\ Pn$$

where P1 ... Pn are the participants, n is the total number of participants, and Pn given is the number of points given by that participant to the particular participant for which the total is being calculated. These point totals may be further modified by weighting criteria applied by the weighting engine 322, as described in greater detail hereafter.

Figure 5A:
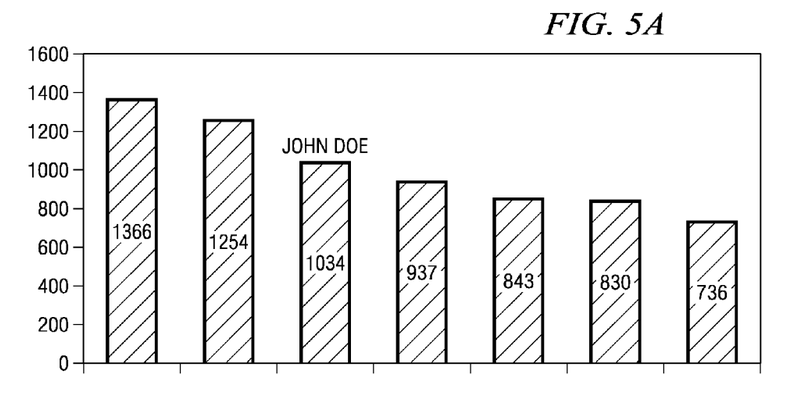
FIG. 5A is an exemplary diagram illustrating a relative contribution graph in accordance with one illustrative embodiment.

The totals for each of the team members provides data for generation of a relative contribution graph, such as shown in FIG. 5A. The relative contribution graph may be generated by the report generation engine 324 and may be provided to the manager or supervisor, and optionally to the team members themselves. It should be noted that the version of the relative contribution graph may be modified for each recipient such that the recipient team member is not informed of the identities of the other team members in the relative contribution graph.

From the total calculation performed by the quantifiable peer feedback calculation engine 318 and the relative contribution graph shown in FIG. 5A generated by the report generation engine 324, the manager/supervisor or team member may be able to see his/her score and the scores of the other team members for the same project effort. The team member's score is identified in his personalized report while all other scores will be unnamed to protect the privacy of the other team members. In the manager/supervisor report, all team members may be identified.

From the relative contribution graph shown in FIG. 5A, a team member may see a visual representation of where he/she scored relative to the other members of the team. By ordering the scores from high to low in a bar graph format, for example, the team member will have a visual reference of his score and its position amongst the ordered scores of the other contributors.

It should be noted that in known peer feedback systems, no quantifiable or relative measure of team members' contributions is provided. Individual presentations of feedback in known systems are limited to only the individual him or herself with no information to provide either a quantification of the contribution or a relative comparison to other contributors to the project, i.e. team members.

In addition to providing a total calculation and a relative contribution graph, the peer feedback system 310 may further process the quantifiable peer feedback received in the responses from the client devices 352-356 to generate various statistical representations of the quantifiable peer feedback. For example, the statistical representation calculation engine 320 may calculate a team percentile for each team member which represents the team member's competitive position on the team by calculating the percentage of team members who scored higher and lower. This measure results in a numeric representation of the team member's position in the ordered (highest scorer to lowest scorer) list of team members. The team percentile tells the team member how many team members, as a percentage, he/she outscored and how many outscored him/her.

The team percentile metric may be calculated as follows:

$$\text{Team\_percentile\_P1} = (n - \text{P1}h)/n$$

$$\text{Team\_percentile\_P2} = (n - \text{P2}h)/n \text{ etc. to Pn}$$

where P1$h$, P2$h$, etc. are the number of participants who received more points than P1, P2, etc.

Figure 5B:
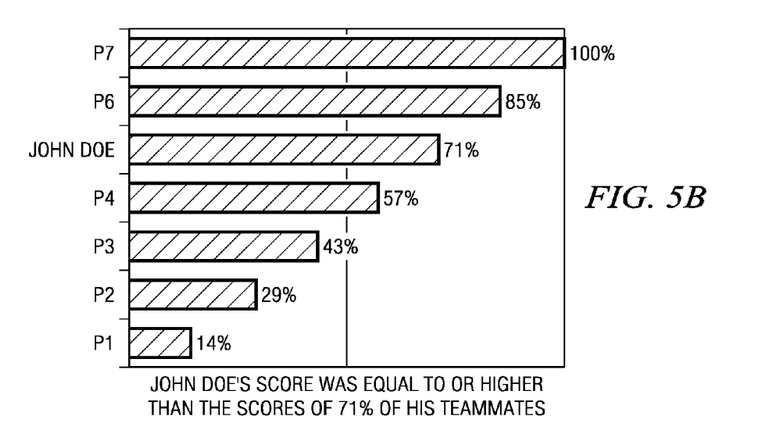
FIG. 5B is an exemplary diagram illustrating a team percentile graph in accordance with one illustrative embodiment.

The team percentile calculations for each of the team members may be used to generate a team percentile graph, such as shown in FIG. 5B. From this team percentile graph, a team member may determine his/her position in the ordered list of team members. Moreover, the team member may make a relative comparison between him or herself and other persons on the same of different teams/projects. For example, the quantifiable peer feedback scores and statistical calculations may be stored in a feedback history storage 328 and may be retrieved for comparison between personnel. Thus, a comparison such as "in 2006, John Doe contributed at the 85$^{th}$ team percentile in project X, but Fred Smith contributed at the 69$^{th}$ team percentile in project Y." Moreover, a historical record of John Doe's peer-evaluated contributions across numerous projects over time may be made, e.g., "since 2002, John Doe has never scored lower than the 85$^{th}$ team percentile, averaging 91% across projects X, Y, Z and Q."

The statistical representation calculation engine 320 may make other statistical analysis and calculations based on the quantifiable peer feedback received from the team members. For example, the statistical representation calculation engine 320 may calculate a score percentile for each team member. The score percentile represents how well (how high) the team member scored relative to the other scores achieved by the other team members. The score percentile tells the team member how close he/she was to the high score and/or bottom score in the range of scores achieved by his/her team members. The score percentile further tells the team member his relative score's position in the overall range of scores achieved by the team and the magnitude of the differences between the scores of the team members.

The score percentile may be used in combination with other statistical measures to provide insight into the performance of each team member. For example, from the statistical measures of score percentile and team percentile, one could determine that while a particular team member, John Doe, may have scored higher than or equal to 95% of his team members, i.e. in the 95$^{th}$ team percentile, he may have scored in the 50$^{th}$ score percentile. This may indicate that while perhaps John Doe had the second highest score, he and most of his team members were far outscored by one particular individual.

The score percentile may be calculated as follows:

$$\text{Score\_percentile\_P1} = (\text{P1\_received} - \text{Low})/(\text{High} - \text{Low})$$

$$\text{Score\_percentile\_P2} = (\text{P2\_received} - \text{Low})/(\text{High} - \text{Low}) \text{ etc. to Pn}$$

where P1_received, P2_received, etc. is score received by the particular team member identified, e.g., participant P1, P2, etc., High is the point total of the highest scoring team member, and Low is the point total of the lowest scoring team member.

Figure 5C:
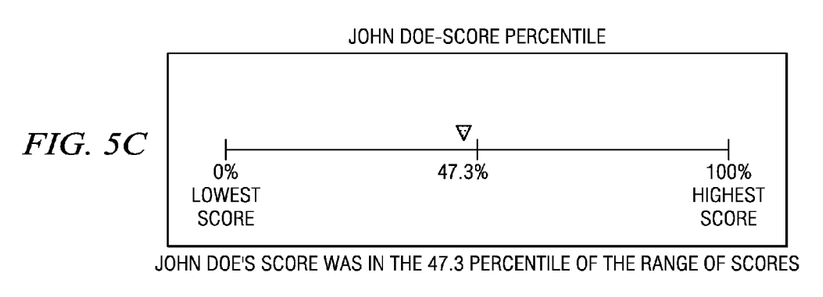
FIG. 5C is an exemplary diagram illustrating a score percentile graph in accordance with one illustrative embodiment.

A score percentile graph report may be generated by the report generation engine 324 in a similar manner as the other graph reports shown in FIGS. 5A and 5B. FIG. 5C shows an example graph of the score percentile statistic which may be generated by the report generation engine 324.

As with the team percentile and other statistical peer feedback information, the score percentile may be stored in the feedback history storage 328 and may be used to compare score percentiles between personnel who worked on different teams/projects as well as provide a historic record of individual team members score percentiles over numerous projects over time. For example, an evaluation of the type "in 2006, John Doe contributed at the 85$^{th}$ Score Percentile in project X, but Fred Smith contributed at the 69$^{th}$ Score Percentile in project Y" may be made. Similarly, an evaluation of the type "Since 2002, John Doe has never scored lower than the 85$^{th}$ Score Percentile, averaging 91% across projects X, Y, Z, and Q."

It should be appreciated that other statistical analysis and calculations may be performed based on the quantified peer feedback received in the responses to the requests sent by the peer feedback system 310. As discussed above, the various statistical values generated by the statistical representation calculation engine 320 may be provided to the report generation engine 324 for generation of reports such as those shown in FIGS. 5A-5C. Moreover, the statistical values may be provided to the feedback history storage 328 for storage as part of a peer feedback history for each team member.

Moreover, the reports generated by the report generation engine 324 may also be stored in the feedback history storage 328 and/or the team/project data storage system 330. The reports may be customized for each of the team members, such as by removing indicators of the other team members other than the one that is receiving the report, and may then be transmitted to the team members at their respective client devices 352-356.

Thus, the mechanisms of the illustrative embodiments provide a system and method for collecting quantifiable peer feedback, calculating quantifiable feedback statistical information based on the collected quantifiable peer feedback, and generating reports of this information for use by managers, supervisors, and the team members themselves. The mechanisms of the illustrative embodiments thus, provide an advantage over known peer feedback systems in that the peer feedback of the illustrative embodiments is made less susceptible to subjective interpretation and provides an ability to perform relative comparisons of team member performance on the same or different projects as well as historical information regarding each team member's performance over a plurality if projects over time.

A number of other illustrative embodiments provide improvements over the basic illustrative embodiment described above. For example, as mentioned above, various weighting factors may be applied to the quantifiable peer feedback returned by various team members. These weighting factors may be based on characteristics of the team members that are providing the quantifiable peer feedback or may be based on the characteristics of the team member for which the quantifiable peer feedback is provided.

As mentioned above, when defining a team in the team/project data storage system 330, the manager or supervisor defining the team may designate different predefined roles for the various team members. These predefined roles may be correlated to weighting factors for weighting the peer feedback scores provided by the other team members. For example, if a team member's role is relatively less involved in the achievement of the goal of the project, but nonetheless required, then the tendency may be for other team members to evaluate the less important role team member as having a lower performance peer feedback evaluation with regard to achieving the goal of the project. This may unfairly indicate that the team member performed below expectations when in fact the team member performed according to expectations but had a relatively minor role in the completion of the project.

In order to address such situations, roles may be associated with weights that increase the peer feedback scores for team members that had relatively minor roles. Moreover, weights may be established for roles of leaders of teams for reducing the peer feedback scores provided by team members since they may be more likely to give such team members in leader roles higher scores out of a sense of team spirit or fear of retribution.

As mentioned above, an indicator of the roles for each of the team members in a defined team may be stored in the team/project data storage system 330. These role identifiers may be correlated with weighting factors stored in the peer feedback system 310 that may then be applied by the quantifiable peer feedback calculation engine 318 and the statistical representation calculation engine 320 to the various statistical calculations described above to generate a weighted total score, weighted team percentile, weighted score percentile, and the like.

In addition, weights may be established for the team members that are submitting the peer feedback such that the same weight may be applied to all peer feedback scores submitted by the same team member regardless of which team member the peer feedback score is for. Such weights may be based on, for example, a determination as to the relative knowledge of the team member submitting the peer feedback score of the duties of the team member for which the peer feedback score is being provided.

Weights for application to the statistical analysis and calculations may further be determined based on information retrieved from external sources, such as the personnel system 370 and the project management system 380. For example, the peer feedback system 310, based on the identifiers of the team members in the team/project data storage system 330, may retrieve personnel information from the personnel system 370. The retrieved personnel information may be used as a basis for determining weights to be applied to either peer feedback given to a team member or peer feedback given by the team member to other team members.

For example, in some organizations, personnel are given employment level identifiers indicating seniority within the organization based on position within the organization, time employed with the organization, or the like. The employment level identifiers may be used to generate a weighting factor for application to the total peer feedback score calculation and the other statistical calculations described above. As one example, if a particular team member has a relatively more senior employment level than other members of the team, then his/her submitted peer feedback scores may be weighted more heavily than other team members.

In one illustrative embodiment, a manager or supervisor may establish a project model for the project with which a particular team is associated. The project model may set forth milestones or sub-projects and associated sub-teams or work groups of personnel, from the personnel that make up the overall team, to achieve the goals of the various milestones or sub-projects. The manager or supervisor may further associate various weights with the various milestones or sub-projects for application to the peer feedback calculations.

For each milestone or sub-project, the personnel assigned to the work group for that milestone or sub-project are evaluated by way of the peer feedback mechanism described previously. That is, the manager or supervisor may access the project management system 380 either directly or via the peer feedback system 310 to indicate when a particular milestone or sub-project has been completed. In response to the input that the sub-project or milestone has been completed, the project management system 380 may send a command to the peer feedback system 310 indicating the work group from which peer feedback is to be sought, the weight to be applied to the peer feedback based on the particular milestone or sub-project that is completed, and the like. The peer feedback system 310, may then send requests for peer feedback to the work group members, collect the peer feedback, perform the statistical calculations taking into account the weights associated with the milestone or sub-project, and generate reports, as described above.

In addition, the work group members' peer feedback scores may be stored in the feedback history storage 328 for later use in determining the total peer feedback for the entire project. Once the final milestone or sub-project is completed and thus, the project as a whole is completed, the peer feedback scores for each individual sub-project or milestone may be totaled for each team member and may be the basis for other statistical calculations for the project as whole. Thus, the individual weights applied to each of the milestones or sub-projects affect the overall peer feedback calculations for the project as a whole. Furthermore, the amount of involvement of a team member in the project by being part of more or less sub-projects or milestones of the project will affect the overall peer feedback calculations for the project as a whole.

In addition to the various weighting mechanisms that may be provided in embodiments of the present invention, the mechanisms of the illustrative embodiments may provide an action plan for team members based on their respective peer feedback scores and statistical calculations. The action plan may further be based on feedback history for the team members, e.g., peer feedback scores and statistical calculations for other projects of which the team member has been a part. The action plan may be determined based on a rule base that, based on a pattern of peer feedback scores over a team member's history, may indicate a need for corrective action. The action plan may be provided by the action plan engine 326 which analyzes the current and previous historical peer feedback scores of a particular team member and, based on a set of established rules, determines a set of helpful suggestions that may be provided to the team member as part of the reports generated by the report generation engine 324.

Thus, the illustrative embodiments may further provide various mechanisms for weighting the calculations performed by the peer feedback system 310 and for providing an action plan to aid a team member in increasing his/her future peer feedback scores on future projects. The peer feedback system 310 may interface with other systems, such as personnel system 370 and project management system 380, in order to obtain information for determining weights to apply to the peer feedback calculations. Moreover, a project model comprising a plurality of sub-projects and associated workgroups may be established and used as a basis for performing peer feedback collection, calculation, and reporting.

Figure 6:
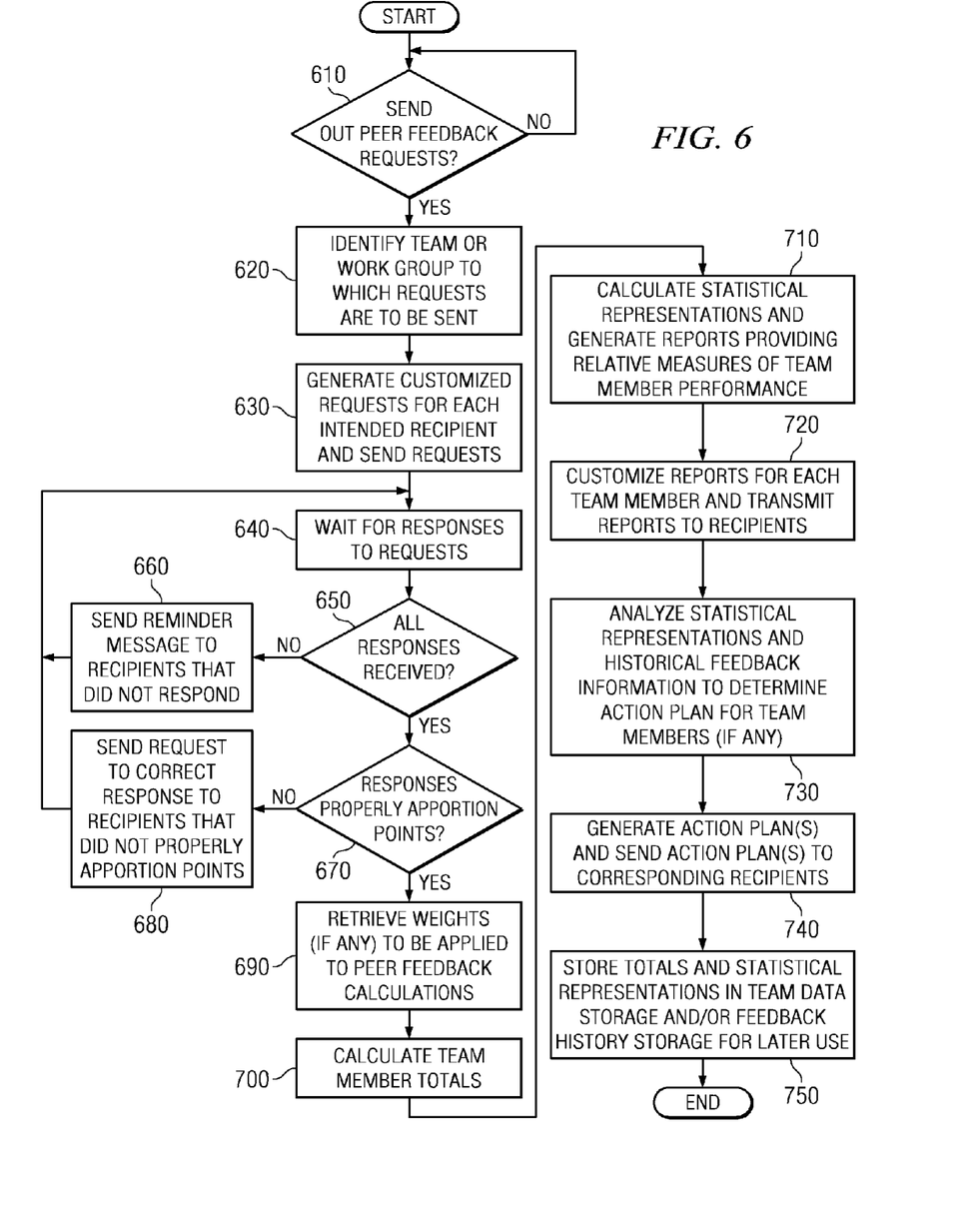
FIG. 6 is a flowchart of an exemplary operation for collecting, calculating, and reporting quantifiable peer feedback in accordance with one illustrative embodiment.

FIG. 6 is a flowchart outlining an exemplary operation for performing quantifiable peer feedback collection, calculation, and reporting. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts with the peer feedback system determining whether it is time to send out requests for peer feedback (step 610). This determination may be made based on whether a manager or supervisor has indicated a need to send out such requests, indicating that a particular sub-project or milestone has been completed, or the like. If it is not time to send out requests, the operation either returns to step 610 and continues to wait until it is time to send out requests (as shown), or the operation may terminate with the operation being repeated at periodic times. If it is time to send out requests, the peer feedback system identifies the team or work group to which such requests are to be sent (step 620). The peer feedback system then generates customized requests for each intended recipient, i.e. team member or work group member, and sends the requests out to the recipients (step 630).

The peer feedback system then waits to receive responses to the requests (step 640). The peer feedback system determines if all responses have been received within a predetermined time period (step 650). If not all responses have been received within a predetermined time period, then reminder messages may be sent to those recipients that have not responded to the original request (step 660). The operation may then return to step 640.

The peer feedback system may then check the responses that were received to the requests to make sure that the recipients of the requests properly responded to the requests by apportioning all of the points in the point pool to the recipients' other team members (step 670). If a response is not proper, the peer feedback system may send a request to the recipient that sent the response to request that they correct their response (step 680). The operation may then return to step 640.

Assuming that all responses have been received and that they properly apportion the points to team members, the peer feedback system retrieves any weights to be applied to peer feedback calculations (step 690). As described above, these weights may be based on many different factors including roles played in performance of the project or sub-project, employee seniority level, relative importance of the project or sub-project, and the like. The peer feedback system then calculates team member totals based on the received peer feedback and any applicable weights (step 700). The peer feedback system further calculates statistical representations of the team member's scores, also using any applicable weights, and generates appropriate reports of these statistical representations providing relative measures of team member performance with regard to other team members' performance (step 710). The peer feedback system customizes the reports for each team member and/or the manager/supervisor and transmits the reports to the team members and/or manager/supervisor (step 720).

The peer feedback system may further analyze the statistical representations and total calculations along with historical feedback information to determine if an action plan is required for any of the team members (step 730). The action plan, if any, may then be generated and sent to the particular team member informing them of suggestions to increase their peer feedback scores for future projects or sub-projects (step 740). The totals and statistical representations may then be stored in a team data storage and/or feedback history storage for later use in determining weights and/or the need for action plans for individual team members (step 750). The operation then terminates.

It should be noted that while the above illustrative embodiments are described in terms of a pool of points to be apportioned amongst a plurality of team members, the illustrative embodiments are not limited to such. Rather, other mechanisms for quantifying peer feedback may be utilized without departing from the spirit and scope of the present invention. Thus, for example, each team member may be given the same range of possible scores, e.g., 0 to 100, without a limitation that the total of all the scores add up to a particular total pool size. The relative contribution may then be determined based on a ratio of the individual team member's points to that of the total number of points allocated. Other quantitative mechanisms for evaluating the relative contribution of team members in a quantifiable manner may be used without departing from the spirit and scope of the present invention.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one processor, for providing quantifiable peer feedback of team members participating in the completion of a task, comprising:

defining, in the data processing system, a team comprising a plurality of team members, wherein the plurality of team members comprises at least three team members, and wherein the at least three team members collaborate to complete the task;

sending, by the data processing system, a request to each team member in the plurality of team members requesting quantifiable peer feedback scores for each of the team member's other team members;

collecting, by the data processing system, the quantifiable peer feedback scores for each of the team members in the plurality of team members;

calculating, by the data processing system, statistical representations of each team member's relative contribution to completion of the task based on the collected quantifiable peer feedback scores;

generating, by the data processing system, one or more reports based on the statistical representations of each team member's relative contribution; and outputting, by the data processing system, the one or more reports, wherein the request is sent to each team member based on team member identifiers associated with a team data structure created as part of defining the team, and wherein the request is customized for each team member such that a version of the request sent to a first team member is different from the request sent to a second team member in that the request sent to the first team member identifies the second and third team members and requests quantifiable peer feedback scores for each of the second and third team members, and the request sent to the second team member identifies the first and third team members and requests quantifiable peer feedback scores for each of the first and third team members.

2. A method, in a data processing system, for providing quantifiable peer feedback of team members participating in the completion of a task, comprising:

defining, in the data processing system, a team comprising a plurality of team members;

sending, by the data processing system, a request to each team member in the plurality of team members requesting quantifiable peer feedback scores for each of the team member's other team members;

collecting, by the data processing system, the quantifiable peer feedback scores for each of the team members in the plurality of team members;

calculating, by the data processing system, statistical representations of each team member's relative contribution to completion of the task based on the collected quantifiable peer feedback scores;

generating, by the data processing system, one or more reports based on the statistical representations of each team member's relative contribution; and outputting, by the data processing system, the one or more reports, wherein collecting the quantifiable peer feedback comprises providing a user interface in the request for apportioning a pool of points amongst a plurality of the other team members, wherein a size of the pool of points is determined based on a number of team members in the plurality of team members, and wherein a first portion of the pool of points is apportioned to a first one of the other team members, and a remaining portion of the pool of points, after apportionment of the first portion, is distributed across one or more second team members in the plurality of other team members such that the pool of points is distributed across the plurality of other team members.

3. The method of claim 1, further comprising:

monitoring responses to the request to confirm that all of the team members in the plurality of team members have responded to the request; and analyzing responses received to confirm that peer feedback provided in the responses is provided correctly.

4. The method of claim 1, wherein the one or more reports are output to the plurality of team members, and wherein generating the one or more reports comprises customizing a report for each of the team members such that a version of the report output to a first team member is different than a version of the report output to a second team member.

5. The method of claim 2, wherein calculating statistical representations of each team member's relative contribution to completion of the task based on the collected quantifiable peer feedback scores comprises calculating a total of apportioned points for each team member, and wherein generating one or more reports comprises generating a relative contribution graph based on totals of apportioned points for each team member.

6. The method of claim 2, wherein calculating statistical representations of each team member's relative contribution to completion of the task based on the collected quantifiable peer feedback scores comprises calculating a team percentile for each team member, and wherein generating one or more reports comprises generating a team percentile graph based on totals of apportioned points for each team member.

7. The method of claim 2, wherein calculating statistical representations of each team member's relative contribution to completion of the task based on the collected quantifiable peer feedback scores comprises calculating a score percentile for each team member, and wherein generating one or more reports comprises generating a score percentile graph based on totals of apportioned points for each team member.

8. The method of claim 1, further comprising:
generating, for each team member, one or more non-zero weighting factors to be applied to peer feedback parameters in calculations for calculating the statistical representations, and wherein calculating statistical representations of each team member's relative contribution to completion of the task based on the collected quantifiable peer feedback scores comprises weighting peer feedback provided in responses from team members using the generated one or more non-zero weighting factors.

9. The method of claim 8, wherein the non-zero weighting factors are determined based on information obtained from one of a personnel system or information obtained from a project management system.

10. The method of claim 8, wherein the non-zero weighting factors are determined based on a history or peer feedback for the particular team member.

11. The method of claim 8, wherein the non-zero weighting factors are determined based on characteristics of one of the team members that are providing the quantifiable peer feedback or characteristics of the team member for which the quantifiable peer feedback is provided.

12. The method of claim 8, wherein the non-zero weighting factors are determined based on one of a role in the team assigned to a team member or an employee level of the team member.

13. The method of claim 8, wherein the non-zero weighting factors are determined based on a weight value associated with the task.

14. The method of claim 1, wherein the method is implemented in response to a user providing an input to a project management system indicating that the task has been completed, wherein the project management system sends a request to the data processing system to perform the method in response to the input.

15. A computer program product comprising a computer useable medium having a computer readable program, wherein the computer readable program, when executed on a computing device, causes the computing device to:
define a team comprising a plurality of team members, wherein the plurality of team members comprises at least three team members, and wherein the at least three team members collaborate to complete the task;
send a request to each team member in the plurality of team members requesting quantifiable peer feedback scores for each of the team member's other team members;
collect the quantifiable peer feedback scores for each of the team members in the plurality of team members;
calculate statistical representations of each team member's relative contribution to completion of the task based on the collected quantifiable peer feedback scores;
generate one or more reports based on the statistical representations of each team member's relative contribution; and
output the one or more reports, wherein the request is sent to each team member based on team member identifiers associated with a team data structure created as part of defining the team, and wherein the request is customized for each team member such that a version of the request sent to a first team member is different from the request sent to a second team member in that the request sent to the first team member identifies the second and third team members and requests quantifiable peer feedback scores for each of the second and third team members, and the request sent to the second team member identifies the first and third team members and requests quantifiable peer feedback scores for each of the first and third team members.

16. A computer program product comprising a computer useable medium having a computer readable program, wherein the computer readable program, when executed on a computing device, causes the computing device to:
define a team comprising a plurality of team members;
send a request to each team member in the plurality of team members requesting quantifiable peer feedback scores for each of the team member's other team members;
collect the quantifiable peer feedback scores for each of the team members in the plurality of team members;
calculate statistical representations of each team member's relative contribution to completion of the task based on the collected quantifiable peer feedback scores;
generate one or more reports based on the statistical representations of each team member's relative contribution; and
output the one or more reports, wherein the computer readable program causes the computing device to collect the quantifiable peer feedback by providing a user interface in the request for apportioning a pool of points amongst a plurality of the other team members, wherein a size of the pool of points is determined based on a number of team members in the plurality of team members, and wherein a first portion of the pool of points is apportioned to a first one of the other team members, and a remaining portion of the pool of points, after apportionment of the first portion, is distributed across one or more second team members in the plurality of other team members such that the pool of points is distributed across the plurality of other team members.

17. The computer program product of claim 15, wherein the computer readable program further causes the computing device to:
monitor responses to the request to confirm that all of the team members in the plurality of team members have responded to the request; and
analyze responses received to confirm that peer feedback provided in the responses is provided correctly.

18. A system, comprising:
a processor; and
a memory coupled to the processor, wherein the memory comprises instructions which, when executed by the processor, cause the processor to:
define a team comprising a plurality of team members;

send a request to each team member in the plurality of team members requesting quantifiable peer feedback scores for each of the team member's other team members;

collect the quantifiable peer feedback scores for each of the team members in the plurality of team members;

calculate statistical representations of each team member's relative contribution to completion of the task based on the collected quantifiable peer feedback scores;

generate one or more reports based on the statistical representations of each team member's relative contribution; and output the one or more reports, wherein the instructions cause the processor to collect the quantifiable peer feedback by providing a user interface in the request for apportioning a pool of points amongst a plurality of the other team members, wherein a size of the pool of points is determined based on a number of team members in the plurality of team members, and wherein a first portion of the pool of points is apportioned to a first one of the other team members, and a remaining portion of the pool of points, after apportionment of the first portion, is distributed across one or more second team members in the plurality of other team members such that the pool of points is distributed across the plurality of other team members.

* * * * *